United States Patent
Inagaki et al.

(10) Patent No.: US 11,879,670 B2
(45) Date of Patent: Jan. 23, 2024

(54) ABSORPTION REFRIGERATOR

(71) Applicant: YAZAKI ENERGY SYSTEM CORPORATION, Tokyo (JP)

(72) Inventors: Motomi Inagaki, Hamamatsu (JP); Yohsuke Yamada, Hamamatsu (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 245 days.

(21) Appl. No.: 17/143,456

(22) Filed: Jan. 7, 2021

(65) Prior Publication Data

US 2021/0231350 A1   Jul. 29, 2021

(30) Foreign Application Priority Data

Jan. 24, 2020   (JP) .................................. 2020-009717

(51) Int. Cl.
*F25B 15/06*   (2006.01)
*F25B 49/04*   (2006.01)
*B67D 1/08*    (2006.01)

(52) U.S. Cl.
CPC ............ *F25B 15/06* (2013.01); *B67D 1/0857* (2013.01)

(58) Field of Classification Search
CPC ...... B67D 1/0857; F25B 15/06; F25B 49/043; Y02B 30/62
See application file for complete search history.

(56) References Cited

U.S. PATENT DOCUMENTS

| 5,623,426 A | 4/1997 | Ozawa et al. |
| 2002/0162341 A1 | 11/2002 | Yamazaki et al. |
| 2021/0064918 A1 | 3/2021 | Imamura |

FOREIGN PATENT DOCUMENTS

| JP | 7-324850 A | | 12/1995 |
| JP | 07324850 A | * | 12/1995 |
| JP | 2002295917 A | | 10/2002 |
| JP | 2009-58161 A | | 3/2009 |
| JP | 2009058161 A | * | 3/2009 |
| WO | 2019224909 A1 | | 11/2019 |

* cited by examiner

*Primary Examiner* — Henry T Crenshaw
(74) *Attorney, Agent, or Firm* — Sughrue Mion, PLLC

(57) ABSTRACT

An absorption refrigerator using a circulation cycle of a regenerator, a condenser, an evaporator, and an absorber includes temperature sensors, a storage unit storing the approximation function for obtaining the second concentration based on second detection results obtained by each of the temperature sensors, a calculation unit to apply the second detection results to the approximation function to obtain the second concentration and a control unit to execute control in accordance with the second concentration. The approximation function is obtained using a response surface method by interpolation or approximation, based on data including first detection results obtained by temperature sensors and first concentrations each corresponding to when each of the first detection results has been obtained.

4 Claims, 3 Drawing Sheets

FIG. 2

| data | DETECTED VALUE | | | | | CONCENTRATION OF CONCENTRATED SOLUTION CS (%) |
|---|---|---|---|---|---|---|
| | Cti | Cto | Hwti | Wto | ... | |
| 1 | 31.80 | 34.30 | 80.50 | 7.70 | | 54.83 |
| 2 | 29.44 | 36.32 | 94.85 | 6.77 | | 55.62 |
| 3 | 29.34 | 35.40 | 90.19 | 6.94 | | 55.16 |
| 4 | 22.59 | 31.24 | 89.74 | 6.94 | | 54.98 |
| 5 | 35.10 | 39.32 | 90.15 | 7.53 | | 55.60 |
| ... | | | | | | |
| 200 | 20.03 | 26.76 | 70.05 | 6.92 | | 51.84 |

ABSORPTION REFRIGERATOR

CROSS-REFERENCE TO RELATED APPLICATION

The present application claims priority to Japanese Patent Application No. 2020-009717 filed on Jan. 24, 2020, the entire content of which is incorporated herein by reference.

TECHNICAL FIELD

The present invention relates to an absorption refrigerator.

BACKGROUND

A related art absorption refrigerator obtains cold water by a circulation cycle of a regenerator, a condenser, an evaporator, and an absorber. The absorption refrigerator employs an evaporator temperature as a substitute of information on changes of absorption force changes due to a change in an air conditioning heat load and/or a cooling water temperature (for example, see JP2009-58161A).

Another related art absorption refrigerator estimates a concentration of a concentrated solution based on an absorption liquid temperature at an outlet of a low-temperature regenerator, a temperature of a cooling water at an outlet, and a condensation temperature of a refrigerant, and determines a concentration abnormality based on the estimated concentration of the concentrated solution (for example, see, JPH07-324850A).

The former of the related art absorption refrigerators described above can be utilized for avoiding refrigerant freezing and crystallization of the absorption liquid due to change in the absorption force by means of, for example, sequentially controlling a refrigerant proportional valve, a concentrated solution proportional valve, an anti-freeze valve, and the like in a stepwise manner in accordance with the absorption force, which has been obtained without using a concentration meter. In addition, in a hot-water fired absorption refrigerator/heater (a type of absorption refrigerator), it is also conceivable to identify an abnormal state of the hot-water fired absorption refrigerator/heater and stop the hot-water fired absorption refrigerator/heater when a temperature sensor detects that an abnormal high-temperature state of an inlet temperature of a cooling water and a heat medium lasting for a certain period of time, for the purpose of avoiding crystallization due to abnormal concentration of an absorption liquid.

When the evaporator temperature is used as a substitute information indicative of the change in the absorption force as in the above-described absorption refrigerator, an accuracy thereof is never high and it is necessary to perform control while taking into account excessively of a safety factor. In addition, the concentration of the absorption liquid is not directly measured either in the hot-water fired absorption refrigerator/heater, and if the safety factor is also excessively taken into consideration, the possibility of frequent stop of the hot-water fired absorption refrigerator/heater is increased.

In order to solve such a problem, it is conceivable to improve accuracy in concentration estimation by performing concentration estimation using a Duhring plot or an experimental formula as in the latter of the related art absorption refrigerators described above. However, the concentration of the absorption liquid is not directly measured in this case, either and there is room for improvement of the concentration estimation accuracy.

Then, although it is conceivable to directly measure the concentration of the absorption liquid using a concentration meter, the concentration meter itself is disadvantageous in terms of cost, and may cause deterioration in reliability of a vacuum environment upon installation thereof.

SUMMARY

Illustrative aspects of the present invention provide an absorption refrigerator configured to perform control more appropriately in accordance with a concentration of an absorption liquid, which is difficult to measure directly.

According to an illustrative aspect of the present invention, an absorption refrigerator configured to obtain a cold water by a circulation cycle of a regenerator, a condenser, an evaporator, and an absorber. A detection result and a concentration of an absorption liquid based on which an approximation function is to be obtained are a first detection result and a first concentration, respectively. A detection result to be applied to the approximation function is a second detection result and a concentration of the absorption liquid to be calculated by applying the second detection result to the approximation function is a second concentration. The absorption refrigerator includes a plurality of temperature sensors provided in the regenerator, the condenser, the evaporator, and the absorber, a storage unit storing the approximation function for obtaining the second concentration based on a plurality of second detection results obtained by each of the plurality of temperature sensors, a calculation unit configured to apply the plurality of second detection results to the approximation function in order to obtain the second concentration and a control unit configured to execute control in accordance with the second concentration obtained by the calculation unit. The approximation function is obtained using a response surface method by interpolation or approximation, based on a mass of data including a plurality of first detection results obtained by each of the plurality of temperature sensors and a plurality of first concentrations each corresponding to when each of the plurality of first detection results has been obtained.

According to the above described absorption refrigerator, since the approximation function for obtaining the concentration of the absorption liquid from the plurality of detection results is stored by the storage unit, by applying the plurality of detection results detected by each of the plurality of sensors to the approximation function, the concentration of the absorption liquid can be accurately obtained without using a concentration meter. Further, since the approximation function is obtained by collecting, via test, a mass of data including the plurality of detection results and the concentrations of the absorption liquid each corresponding to when each of the plurality of detection results has been obtained, it is possible to achieve an accuracy difficult to achieve in concentration estimation based on theoretical values. Thus, it is possible to provide an absorption refrigerator capable of performing control more appropriately in accordance with a concentration of an absorption liquid, which is difficult to measure directly.

BRIEF DESCRIPTION OF DRAWINGS

FIG. 2 is a conceptual diagram illustrating collected data; and

DESCRIPTION OF EMBODIMENTS

Hereinafter, the present invention will be described in accordance with preferred embodiments. The present invention is not limited to the following embodiments, and can be modified as appropriate without departing from the scope of the present invention. Although a part of configurations may not be illustrated or described in the embodiments to be described below, it goes without saying that a known or well-known technique is appropriately applied to details of an omitted technique within a range in which no contradiction occurs to contents to be described below.

Figure 1:
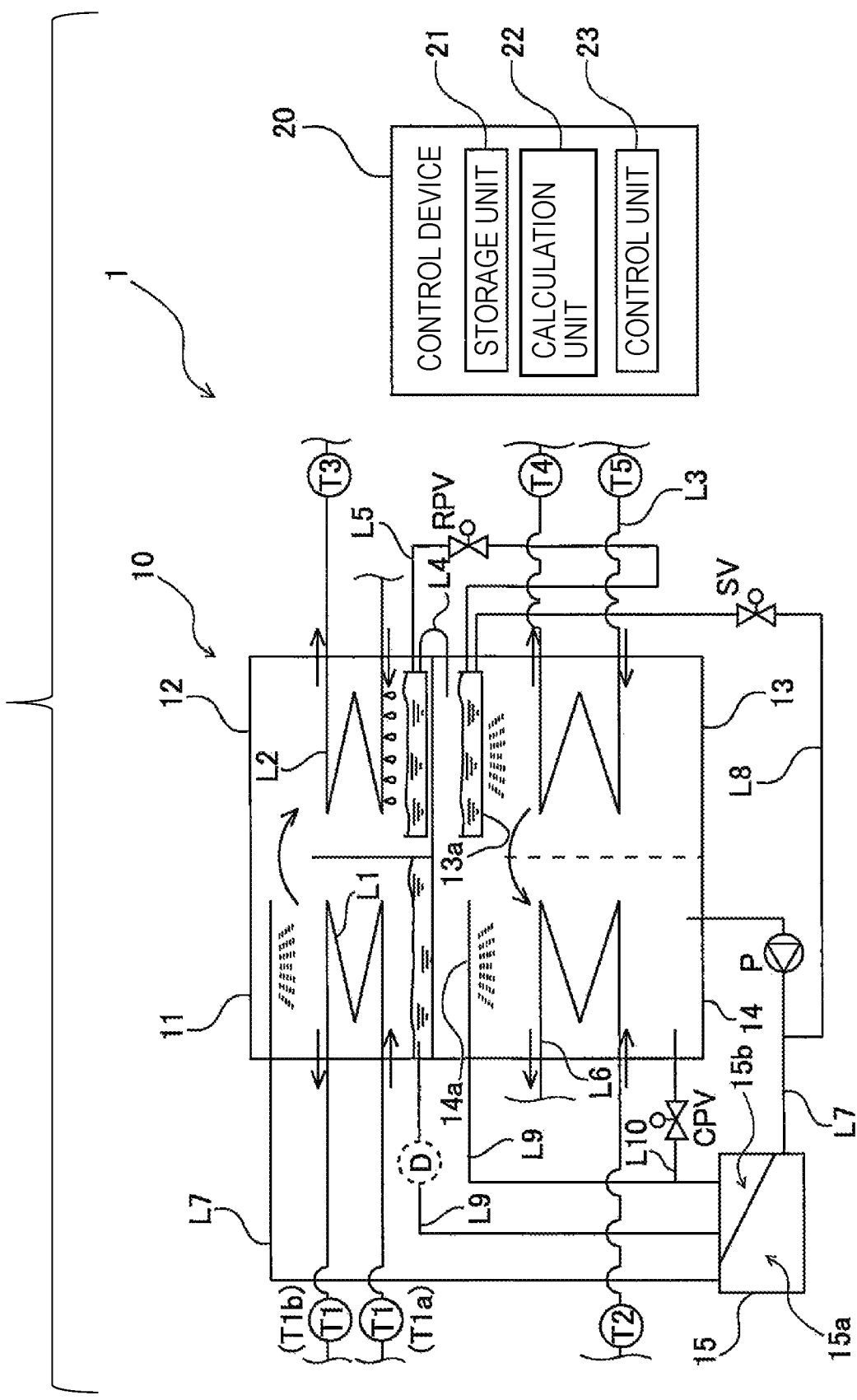
FIG. 1 is a configuration diagram of an absorption refrigerator according to embodiments of the present invention.

FIG. 1 is a configuration diagram of an absorption refrigerator according to embodiments of the present invention. An absorption refrigerator 1 shown in FIG. 1 obtains cold water by a circulation cycle of a regenerator 11, a condenser 12, an evaporator 13, and an absorber 14, and includes an absorption refrigerator body 10 and a control device 20.

In addition to the regenerator 11, the condenser 12, the evaporator 13, and the absorber 14, the absorption refrigerator body 10 includes a solution heat exchanger 15, various pipes L1 to L10, a solution pump P, a plurality of sensors (such as temperature sensors) T1 to T5 provided in respective units, and various valves RPV, SV, and CPV.

The regenerator 11 heats, for example, a dilute solution (a solution having a low concentration of an absorption liquid) obtained by mixing water serving as a refrigerant (hereinafter, a vaporized refrigerant is referred to as a vapor refrigerant, and a liquefied refrigerant is referred to as a liquid refrigerant) with lithium bromide (LiBr), serving as an absorption liquid. A heat source is disposed in the regenerator 11, and the diluted solution is heated by the heat source.

In an embodiment, a heat medium (e.g., warm water) is employed as the heat source, and the diluted solution is heated by the heat medium introduced through a heat medium pipe L1. The regenerator 11 releases vapor from the diluted solution by such heating, and separates the diluted solution into the vapor refrigerant and a concentrated solution (a solution having a high concentration of the absorption liquid).

The condenser 12 liquefies (condenses) the vapor refrigerant supplied from the regenerator 11. A first cooling water heat transfer pipe L2 is provided inside the condenser 12. Cooling water is supplied from a cooling tower or the like to the first cooling water heat transfer pipe L2, and the vapor refrigerant evaporated by the regenerator 11 is liquefied by the cooling water in the first cooling water heat transfer pipe L2. The liquid refrigerant liquefied in the condenser 12 is supplied to the evaporator 13.

The evaporator 13 evaporates the liquid refrigerant. The evaporator 13 includes a refrigerant distributor 13a for receiving the liquid refrigerant condensed by the condenser 12. The refrigerant distributor 13a drops (sprays) the received liquid refrigerant. Further, a cold water heat transfer pipe L3 is provided inside the evaporator 13. The cold water heat transfer pipe L3 is connected to, for example, an air conditioner, and warm water obtained by cooling indoor air by the air conditioner flows therein. In addition, the inside of the evaporator 13 is in a vacuum state. Therefore, the liquid refrigerant dropped onto the cold water heat transfer pipe L3 by the refrigerant distributor 13a is evaporated by a temperature of the cold water heat transfer pipe L3. A temperature of the water in the cold water heat transfer pipe L3 is lowered by evaporation of the liquid refrigerant. As a result, the water in the cold water heat transfer pipe L3 is supplied to the air conditioner as cold water, and the air conditioner supplies cold air to a room using the cold water.

The condenser 12 and the evaporator 13 are connected to each other by a first refrigerant pipe L4 and a second refrigerant pipe L5. The first and second refrigerant pipes L4 and L5 connect a lower part of the condenser 12 and the refrigerant distributor 13a of the evaporator 13, and supply the liquid refrigerant of the condenser 12 to the refrigerant distributor 13a of the evaporator 13. The second refrigerant pipe L5 out of the first and second refrigerant pipes L4 and L5 is provided with a refrigerant proportional valve RPV. The absorption refrigerator body 10 can control an inflow rate of the liquid refrigerant from the condenser 12 to the evaporator 13 by adjusting an opening degree of the refrigerant proportional valve RPV.

The absorber 14 absorbs the vapor refrigerant evaporated in the evaporator 13. The absorber 14 includes a concentrated solution sprayer 14a. The concentrated solution sprayer 14a sprays the concentrated solution from the regenerator 11 in the absorber 14. The vapor refrigerant from the evaporator 13 is absorbed by the concentrated solution sprayed by the concentrated solution sprayer 14a. As a result, a diluted solution is generated. In addition, a second cooling water heat transfer pipe L6 is inserted into the absorber 14. Cooling water from a cooling tower or the like flows in the second cooling water heat transfer pipe L6, and absorption heat generated by absorption of the vapor refrigerant by the concentrated solution is removed by the cooling water in the second cooling water heat transfer pipe L6. The second cooling water heat transfer pipe L6 is connected to the first cooling water heat transfer pipe L2.

Here, the absorber 14 and the regenerator 11 are connected by a first solution pipe L7. A solution pump P and a solution heat exchanger 15 are disposed on the first solution pipe L7. The solution pump P delivers the diluted solution of the absorber 14 to the regenerator 11. The diluted solution is delivered by the solution pump P to the regenerator 11 via a first region 15a of the solution heat exchanger 15. In particular, the diluted solution is delivered to the regenerator 11 after being heated by a high-temperature concentrated solution in a second region 15b, which will be described later, in the first region 15a of the solution heat exchanger 15.

The absorption refrigerator body 10 further includes a first branch pipe L8. The first branch pipe L8 has one end connected to a portion of the first solution pipe L7 between the solution pump P to the solution heat exchanger 15, and has the other end connected to the refrigerant distributor 13a. The first branch pipe L8 is provided with an anti-freeze valve SV. The absorption refrigerator body 10 can mix the diluted solution into the refrigerant sprayed from an upper part of the evaporator 13 by opening and closing the anti-freeze valve SV.

The regenerator 11 and the absorber 14 are also connected by a second solution pipe L9. The solution heat exchanger 15 is disposed on the second solution pipe L9. The high-temperature concentrated solution obtained by the regeneration by the regenerator 11 reaches the second region 15b of the solution heat exchanger 15 and heats the diluted solution in the first region 15a, and then is delivered to the concentrated solution sprayer 14a of the absorber 14.

The absorption refrigerator body 10 further includes a second branch pipe L10 branched from the second solution pipe L9. The second branch pipe L10 has one end connected to a downstream side with respect to the solution heat exchanger 15 in the second solution pipe L9, and has the other end extending to a lower part of the absorber 14. The second branch pipe L10 is provided with a concentrated solution proportional valve CPV. The absorption refrigerator body 10 can guide the concentrated solution obtained via regeneration in the regenerator 11 to the lower part of the absorber 14 without spraying from an upper part of the absorber 14 and control an amount thereof by controlling an opening degree of the concentrated solution proportional valve CPV.

The absorption refrigerator body 10 heats the diluted solution with a heat medium, and includes a first sensor T1 configured to detect a heat medium temperature in the regenerator 11 (regenerator temperature). The first sensor T1 includes a heat medium inlet temperature sensor T1$a$ for detecting a heat medium temperature supplied to the regenerator 11. The first sensor T1 preferably includes a heat medium outlet temperature sensor T1$b$ for detecting a heat medium temperature discharged from the regenerator 11 from the viewpoint of measuring an amount of heat obtained in the regenerator 11 (regenerative heat amount). In the following description, the first sensor T1 is described as including both the heat medium inlet temperature sensor T1$a$ and the heat medium outlet temperature sensor T1$b$.

The absorption refrigerator body 10 further includes second to fifth sensors T2 to T5. The second sensor T2 detects a cooling water inlet temperature, which is a temperature of a cooling water on an inlet side of the absorber 14, the cooling water being to be supplied to the condenser 12 via the absorber 14. The third sensor T3 detects a cooling water out temperature, which is a temperature of the cooling water on an outlet side of the condenser, the cooling water being to be supplied to the condenser 12 via the absorber 14. The fourth sensor T4 detects a cold water outlet temperature, which is a temperature of the cold water supplied from the evaporator 13 to the air conditioner. The fifth sensor T5 detects a cold water inlet temperature, which is a temperature of the cold water returning from the air conditioner to the evaporator 13.

The control device 20 includes a storage (storage unit) 21, a calculator (calculation unit) 22, and a controller (control unit) 23.

The storage 21 stores an approximation function for obtaining the concentration (second concentration) of the absorption liquid (concentrated solution) based on detected values obtained by the plurality of sensors T1 to T5 (detected values are an example of a plurality of second detection results, where the "plurality" is preferably 4 or more). Specifically, the storage 21 stores an approximation function of following Formula 1.

$$CS\ (\%) = \alpha1 \times f(x1) + \alpha2 \times f(x2) + \alpha3 \times f(x3) + \alpha4 \times f(x4) + \ldots \alpha n \times f(xn),$$ [Formula 1]

in which CS is concentration of concentrated solution. Here, $\alpha1$ to $\alpha n$ are coefficients, and are numerical values of, for example, "−1.00", "0.93", and "8.05", and f(x1) to f(xn) are functions to use at least one detected value obtained by the plurality of sensors T1 to T5 as a variable.

Such an approximation function is obtained by collecting, via tests, a large number of sets of data (a mass of data) including the detected values (first detection results) obtained by the plurality of sensors T1 to T5 and the concentrations (first concentrations) of the absorption liquid when the detected values are obtained, i.e., each of the first concentrations of the absorption liquid corresponds to each time when each of the plurality of first detection results has been obtained (more specifically, collecting a large number of sets of data or a mass of data by attaching a concentration meter D to a real machine in advance and operating the machine), and executing a calculation based on the collected results using a response surface method (RSM) by interpolation or approximation. This is because, according to the response surface method, it is possible to calculate/obtain an approximation function for obtaining the concentration of the absorption liquid (concentrated solution) more accurately based on a large number of detected values. In particular, the approximation function may be calculated using stepwise regression, which has a high approximation accuracy among approximation methods using the response surface method. The detection result and the concentration of the absorption liquid based on which the approximation function is calculated are the first detection result and the first concentration, respectively.

For the data collection, for example, as shown in FIG. 1, the concentration meter D is actually installed in a flow path through which the concentrated solution flows (for example, the second solution pipe L9), so as to collect information including the detected values obtained by the plurality of sensors T1 to T5 and the concentrations indicated by the concentration meter D.

Now referring to FIG. 2 showing a conceptual diagram illustrating the collected data. In FIG. 2, Cti indicates a detected value obtained by the second sensor T2 (cooling water inlet temperature), and Cto indicates a detected value obtained by the third sensor T3 (cooling water outlet temperature). Hwti indicates a detected value obtained by the heat medium inlet temperature sensor T1$a$, and Wto indicates a detected value obtained by the fourth temperature sensor T4 (cold water outlet temperature). The storage 21 according to the embodiment is configured to store an approximation function calculated based on such collected data. In FIG. 2, illustration of the detected values obtained by the heat medium outlet temperature sensor T1$b$ and the fifth temperature sensor T5 is omitted. In the absorption refrigerator 1 according to the embodiment, from the viewpoint of improving the accuracy, it is preferable to separately provide a further sensor/sensors and to store an approximation function obtained by collecting data including a detected value(s) obtained by this (these) sensor(s) as well.

The calculator 22 is configured to apply at least each of the detected values obtained by each of the plurality of sensors T1 to T5 to the approximation function stored in the storage 21 so as to determine the concentration of the concentrated solution. By determining the concentration of the concentrated solution in this manner, the concentration of the concentrated solution can be identified more accurately even without providing the concentration meter D (see FIG. 1).

The controller 23 is configured to execute control in accordance with the concentration of the absorption liquid obtained by the calculator 22. The controller 23 is configured to control, in accordance with the concentration of the concentrated solution obtained by the calculator 22, the opening degree of the refrigerant proportional valve RPV, the opening degree of the concentrated solution proportional valve CPV, and opening and closing of the anti-freeze valve SV. In the present embodiment, the controller 23 is configured to control all the valves RPV, CPV, and SV, but is not limited thereto, and may control at least one thereof.

Here, since the absorption force is preferably high in the absorption refrigerator 1 from the viewpoint of efficiency, the concentration of the concentrated solution is preferably high as well. However, when the concentration of the absorption liquid is excessively high, crystallization problems may arise due to freezing or the like. Therefore, the controller 23 is configured to control the opening degrees of the refrigerant proportional valve RPV and the opening degree of the concentrated solution proportional valve CPV such that the absorption force (concentration) falls within a predetermined range (for example, 59% to 60%).

The controller 23 is configured to fully open the refrigerant proportional valve RPV at the time of high concentration abnormality of the absorption liquid (for example, at a concentration of 61% or more). As a result, the amount of the liquid refrigerant sprayed from the refrigerant distributor 13a is maximized, and it is possible to greatly reduce the concentration of the absorption liquid. Moreover, the controller 23 is configured to fully open the concentrated solution proportional valve CPV at the time of high concentration abnormality of the absorption liquid. As a result, the amount of the concentrated solution sprayed in the absorber 14 is minimized. That is, a large amount of the concentrated solution is supplied directly to the lower part of the absorber 14, which makes it difficult to absorb the vapor refrigerant. As a result, it is possible to greatly reduce the absorption force and reduce the concentration of the absorption liquid. Furthermore, the controller 23 is configured to open (fully open) the anti-freeze valve SV at the time of high concentration abnormality of the absorption liquid. As a result, the diluted solution is supplied to and sprayed by the refrigerant distributor 13a, and it is possible to further reduce the absorption force so as to reduce the concentration of the absorption liquid.

Figure 3:
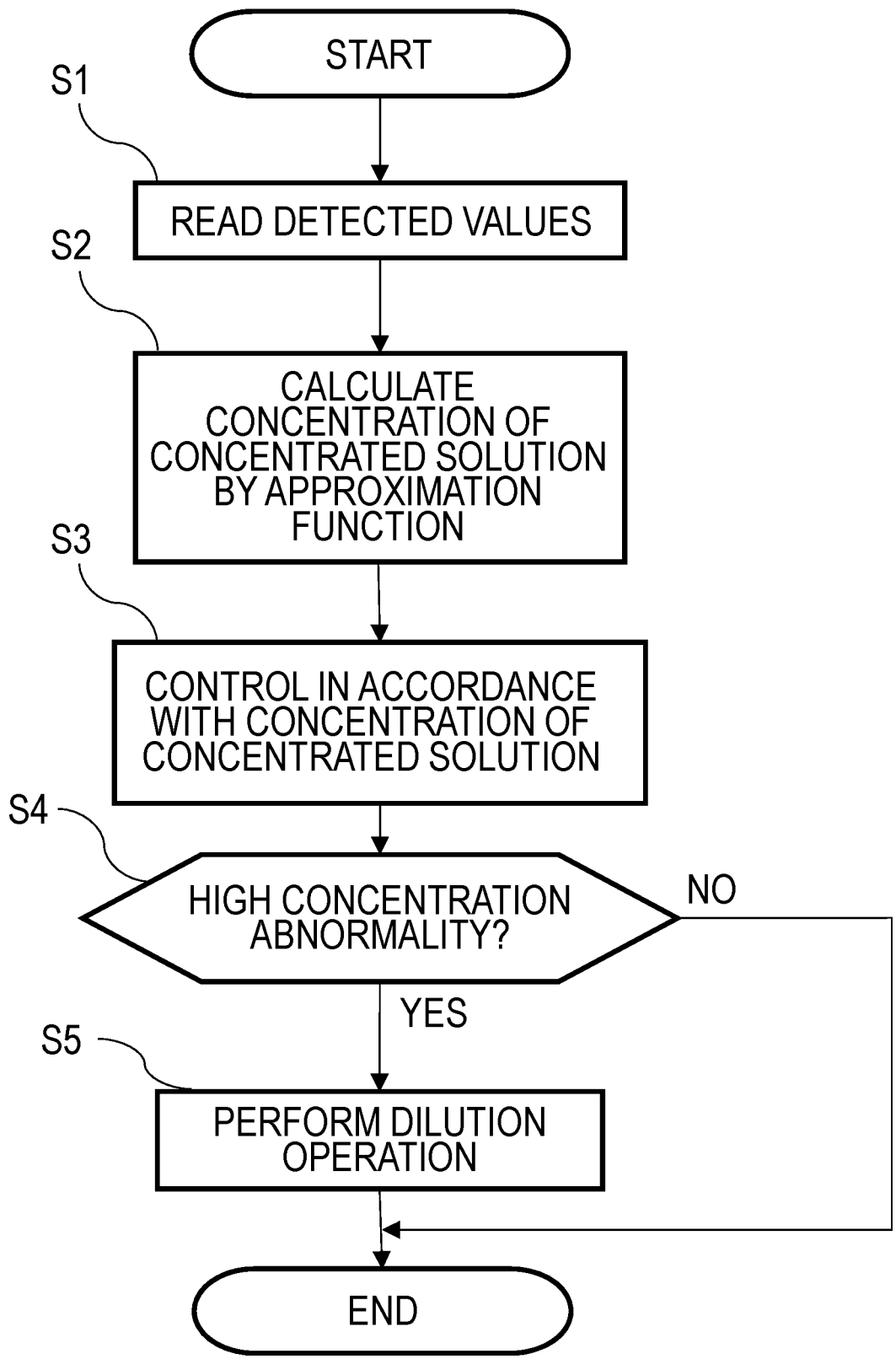
FIG. 3 is a flowchart showing an operation of the absorption refrigerator according to an embodiment.

Now referring to FIG. 3 showing a flowchart illustrating an operation of the absorption refrigerator 1 according to the embodiment. As shown in FIG. 3, first, the control device 20 reads the detected values (second detection results) obtained by the plurality of sensors T1 to T5 (S1). Next, the calculator 22 applies the detected values read in step S1 to the approximation function stored in the storage 21 to calculate the concentration (second concentration) of the concentrated solution (S2). In short, the detection result to be applied to the approximation function is the second detection result and the concentration of the absorption liquid to be calculated by applying the second detection result to the approximation function is the second concentration.

Next, the controller 23 performs control in accordance with the concentration of the concentrated solution calculated in step S2 (S3). Therefore, the opening degrees of the refrigerant proportional valve RPV and the opening degree of the concentrated solution proportional valve CPV are controlled such that the concentration of the absorption liquid falls within the predetermined range. Next, the controller 23 determines whether the concentration of the concentrated solution calculated in step S2 is in the state of high concentration abnormality (S4). When it is determined that the concentration of the concentrated solution is not in the state of high concentration abnormality (S4: NO), the process shown in FIG. 3 is ended.

On the other hand, when it is determined that the concentration of the concentrated solution is in the state of high concentration abnormality (S4: YES), the controller 23 performs dilution operation (S5). In this process, the controller 23 fully opens the refrigerant proportional valve RPV, the concentrated solution proportional valve CPV, and the anti-freeze valve SV. Then, the process shown in FIG. 3 is ended.

In this way, according to the absorption refrigerator 1 according to the embodiment, since the approximation function for obtaining the concentration of the absorption liquid from the plurality of detection results is stored, by applying the plurality of detection results detected obtained by each of the plurality of sensors T1 to T5 to the approximation function, the concentration of the absorption liquid can be obtained without using the concentration meter D. Further, since the approximation function is obtained by collecting, via test, a large number of sets of the data including the detected values obtained by the plurality of sensors T1 to T5 and the concentrations of the absorption liquid (detected values) corresponding each time when the detected values of the plurality of sensors T1 to T5 were obtained, it is possible to achieve an accuracy that is difficult to achieve in estimation of concentration based on theoretical values. Thus, it is possible to provide an absorption refrigerator 1 configured to perform control more appropriately in accordance with a concentration of an absorption liquid, which is difficult to measure directly.

Since the refrigerant proportional valve RPV, the concentrated solution proportional valve CPV, and the anti-freeze valve SV are controlled in accordance with the obtained concentration of the concentrated solution, it is possible to appropriately control the absorption force in accordance with the absorption liquid concentration.

Next, another embodiment of the present invention will be described. An absorption refrigerator according to the another embodiment is the same as that of the embodiment, except for some different processing contents. Hereinafter, differences from the embodiment will be described.

In the another embodiment, the storage 21 is configured to store two approximation functions. One approximation function (first function) is for obtaining the concentration of the concentrated solution from the detected values obtained by the plurality of sensors T1 to T5 (the plurality of detection results), as in the embodiment. The other approximation function (second function) is for obtaining a concentration of the diluted solution from the detected values obtained by the plurality of sensors T1 to T5 (the plurality of detection results). The second function is also calculated in the same manner as described in the embodiment. The first function and the second function may be applied with not only the detected values obtained by the plurality of sensors T1 to T5 but also detected values of other sensors.

In the another embodiment, the calculator 22 is configured to determine the concentration of the concentrated solution by applying the detected values obtained by the plurality of sensors T1 to T5 to the first function, and obtains the concentration of the diluted solution by applying the detected values obtained by the plurality of sensors T1 to T5 to the second function.

The controller 23 is configured to control abnormality determination of the circulation amount of the absorption liquid in accordance with a concentration difference between the concentrated solution and the diluted solution calculated by the calculator 22. Here, the concentration difference between the concentrated solution and the diluted solution can be regarded as the circulation amount of the absorption liquid. Therefore, it is possible to determine abnormality of the circulation amount such as abnormality of the solution pump P or clogging of a filter, for example, without actually measuring a flow rate of the absorption liquid.

The flowchart for the another embodiment is the same as that shown in FIG. 3.

As described above, according to the absorption refrigerator 1 according to the another embodiment, it is possible to provide an absorption refrigerator configured to perform control appropriately in accordance with a concentration of an absorption liquid, which is difficult to measure directly, as in the first embodiment.

In addition, since the abnormality determination of the circulation amount of the absorption liquid is executed in accordance with the identified concentration difference between the concentrated solution and the diluted solution, it is possible to regard the concentration difference as the circulation amount of the absorption liquid, so as to perform appropriate control without using a flow rate sensor.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

For example, in the above embodiment, the regenerator 11 heats the diluted solution with a heating medium, but is not limited thereto, and may heat using a fuel such as a gas and a woody pellet. In the above embodiment, the first sensor T1 detects the heat medium temperature, but is not limited thereto, and may detect a temperature inside the regenerator 11, or may detect the temperature of the concentrated solution immediately after heating.

In the above embodiment, all of the plurality of sensors T1 to T5 are temperature sensors, but are not particularly limited to temperature sensors, and may be sensors of a type other than the concentration meter D.

What is claimed is:

1. An absorption refrigerator configured to obtain a cold water by a circulation cycle of a regenerator, a condenser, an evaporator, and an absorber, the absorption refrigerator comprising:
   a plurality of temperature sensors provided in the regenerator, the condenser, the evaporator, and the absorber;
   a concentrated solution proportional valve configured to guide a concentrated solution obtained via regeneration in the regenerator to a lower part of the absorber without spraying the concentrated solution from an upper part of the absorber;
   an anti-freeze valve configured to mix a diluted solution into a refrigerant sprayed from an upper part of the evaporator;
   a storage storing an approximation function by which a second concentration of an absorption liquid is obtained, the approximation function being obtained in advance using a response surface method, based on a mass of data including: a plurality of first detection results obtained by each of the plurality of temperature sensors; and a plurality of first concentrations of the absorption liquid each corresponding to when each of the plurality of first detection results has been obtained;
   a calculator configured to apply a plurality of second detection results obtained by each of the plurality of temperature sensors to the approximation function in order to obtain the second concentration of the absorption liquid; and
   a controller configured to execute control in accordance with the second concentration obtained by the calculator to control an opening degree of the concentrated solution proportional valve and opening and closing of the anti-freeze valve.

2. The absorption refrigerator according to claim 1, wherein the plurality of temperature sensors include:
   a first sensor configured to detect a regenerator temperature in the regenerator;
   a second sensor configured to detect a cooling water inlet temperature being a temperature of a cooling water on an inlet side of the absorber, the cooling water configured to be supplied to the condenser via the absorber;
   a third sensor configured to detect a cooling water outlet temperature being a temperature of the cooling water on an outlet side of the condenser, the cooling water being configured to be supplied to the condenser via the absorber;
   a fourth sensor configured to detect a cold water outlet temperature being a temperature of a cold water configured to be supplied from the evaporator to an air conditioner; and
   a fifth sensor configured to detect a cold water inlet temperature being a temperature of the cold water returning from the air conditioner to the evaporator,
   wherein the calculator is further configured to apply the plurality of second detection results to the approximation function in order to obtain the second concentration of concentrated solution, and
   wherein the controller is configured to control, in accordance with the second concentration of the concentrated solution obtained by the calculator, an opening degree of a refrigerant proportional valve configured to control an amount of a refrigerant supplied from the condenser to the evaporator.

3. The absorption refrigerator according to claim 1, wherein the approximation function includes a first function and a second function,
   wherein the plurality of temperature sensors include:
   a first sensor configured to detect a regenerator temperature in the regenerator;
   a second sensor configured to detect a cooling water inlet temperature being a temperature of a cooling water on an inlet side of the absorber, the cooling water being to be supplied to the condenser via the absorber;
   a third sensor configured to detect a cooling water outlet temperature being a temperature of the cooling water on an outlet side of the condenser, the cooling water to be supplied to the condenser via the absorber;
   a fourth sensor configured to detect a cold water outlet temperature being a temperature of a cold water to be supplied from the evaporator to an air conditioner; and
   a fifth sensor configured to detect a cold water inlet temperature being a temperature of the cold water returning from the air conditioner to the evaporator,
   wherein the calculator is configured to:
   apply the plurality of second detection results to the first function to obtain the second concentration of a concentrated solution; and
   apply the plurality of second detection results to the second function to obtain the second concentration of a diluted solution, and
   wherein the controller is configured to execute abnormality determination of a circulation amount of the absorption liquid in accordance with a concentration difference between the concentrated solution and the diluted solution obtained by the calculator.

4. An absorption refrigerator configured to obtain a cold water by a circulation cycle of a regenerator, a condenser, an evaporator, and an absorber,
   the absorption refrigerator comprising:
   a plurality of temperature sensors provided in the regenerator, the condenser, the evaporator, and the absorber;

a concentrated solution proportional valve configured to guide a concentrated solution obtained via regeneration in the regenerator to a lower part of the absorber without spraying the concentrated solution from an upper part of the absorber;

an anti-freeze valve configured to mix a diluted solution into a refrigerant sprayed from an upper part of the evaporator;

a storage storing an approximation function by which a second concentration of an absorption liquid is obtained, the approximation function being obtained in advance using a response surface method, based on a mass of data including: a plurality of first detection results obtained by each of the plurality of temperature sensors; and a plurality of first concentrations of the absorption liquid each corresponding to when each of the plurality of first detection results has been obtained;

a calculator configured to apply a plurality of second detection results obtained by each of the plurality of temperature sensors to the approximation function in order to obtain the second concentration of the absorption liquid; and a controller configured to execute control in accordance with the second concentration obtained by the calculator, wherein the approximation function is defined as $$CS = \alpha_1 \times f(x_1) + \alpha_2 \times f(x_2) + \alpha_3 \times f(x_3) + \alpha_4 \times f(x_4) + \ldots \alpha_n \times f(x_n),$$

where CS is a concentration of absorption, $\alpha_1$ to $\alpha_n$ are numerical constants, and $f(x_1)$ to $f(x_n)$ are functions of the plurality of temperature sensors.

* * * * *